US008229130B2

(12) United States Patent
Paradiso et al.

(10) Patent No.: US 8,229,130 B2
(45) Date of Patent: Jul. 24, 2012

(54) DISTRIBUTED ACOUSTIC CONVERSATION SHIELDING SYSTEM

(75) Inventors: Joseph A. Paradiso, Medford, MA (US); Yasuhiro Ono, Saitama (JP)

(73) Assignee: Massachusetts Institute of Technology, Cambridge, MA (US)

(*) Notice: Subject to any disclaimer, the term of this patent is extended or adjusted under 35 U.S.C. 154(b) by 896 days.

(21) Appl. No.: 12/208,320

(22) Filed: Sep. 10, 2008

(65) Prior Publication Data
US 2009/0097671 A1 Apr. 16, 2009

Related U.S. Application Data

(63) Continuation-in-part of application No. 11/874,198, filed on Oct. 17, 2007, now abandoned.

(60) Provisional application No. 60/971,259, filed on Sep. 10, 2007.

(51) Int. Cl.
*H04R 3/02* (2006.01)

(52) U.S. Cl. .............. 381/73.1; 381/71.14; 381/94.1; 379/88.01

(58) Field of Classification Search ............ 381/73.1, 381/94.1, 152, 77, 71.1; 704/270, 275, 223; 379/88.01, 88.02; 380/252; 348/152–169
See application file for complete search history.

(56) References Cited

U.S. PATENT DOCUMENTS

| | | | | |
|---|---|---|---|---|
| 7,362,973 | B1* | 4/2008 | Dickson et al. | 398/40 |
| 7,522,036 | B1* | 4/2009 | Preuss et al. | 340/531 |
| 7,692,685 | B2* | 4/2010 | Beal et al. | 348/169 |
| 2003/0002687 | A1* | 1/2003 | Raptopoulos et al. | 381/71.1 |
| 2003/0228025 | A1* | 12/2003 | Hannah | 381/113 |
| 2004/0125922 | A1* | 7/2004 | Specht | 379/88.01 |
| 2006/0109983 | A1* | 5/2006 | Young et al. | 380/252 |
| 2008/0002836 | A1* | 1/2008 | Moeller et al. | 381/73.1 |
| 2008/0094210 | A1* | 4/2008 | Paradiso et al. | 340/540 |
| 2008/0281588 | A1* | 11/2008 | Akagi et al. | 704/223 |

* cited by examiner

*Primary Examiner* — Vivian Chin
*Assistant Examiner* — Friedrich W Fahnert
(74) *Attorney, Agent, or Firm* — Norma E. Henderson

(57) ABSTRACT

A conversation shielding system comprises sensors that detect the location of a confidential conversation and the presence and location of a potential eavesdropper, audio output devices that produce masking sounds to shield the conversation from the eavesdropper, and a controller that automatically controls the operation of the output devices in response to data from the sensors. An optional portable controller may manually engage the system. A method for shielding conversation comprises identifying a conversation to be shielded, detecting a potential eavesdropper, automatically determining masking sound types, locations and volume that will shield the conversation, directing emission of masking sounds from at least one audio output device in order to shield the conversation, including adjusting the masking sound type, location, and volume in response to movement of the conversation or the eavesdropper, and continuing to shield the conversation until it ends or the eavesdropper is no longer detected.

20 Claims, 10 Drawing Sheets

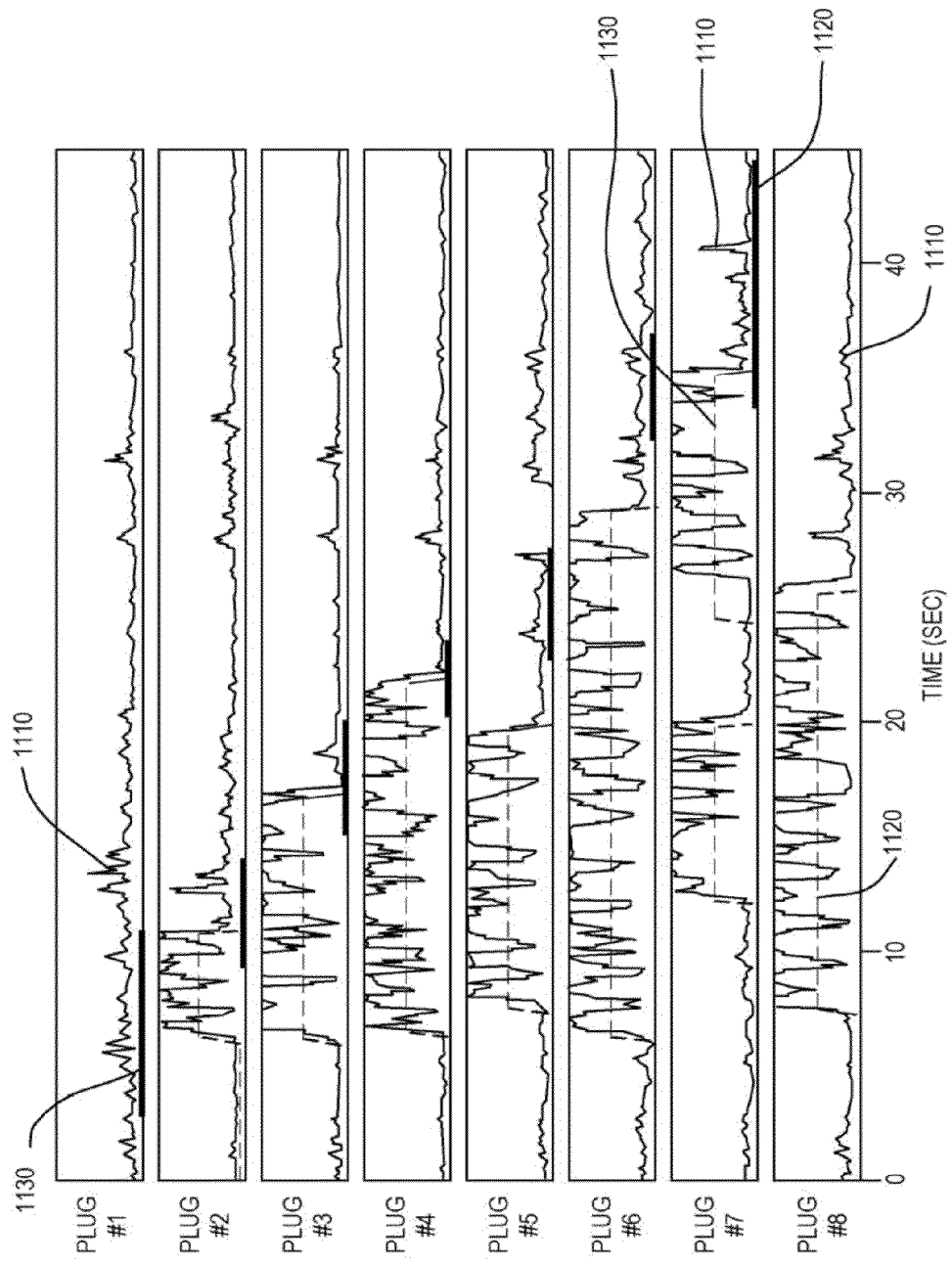

DISTRIBUTED ACOUSTIC CONVERSATION SHIELDING SYSTEM

RELATED APPLICATIONS

This application claims the benefit of U.S. Provisional Application Ser. No. 60/971,259, filed Sep. 10, 2007, the entire disclosure of which is herein incorporated by reference.

This application is a continuation-in-part of co-pending U.S. patent application Ser. No. 11/874,198, filed Oct. 17, 2007, the entire disclosure of which is herein incorporated by reference, which claims the benefit of U.S. Provisional Application Ser. No. 60/852,481, filed Oct. 17, 2006.

FIELD OF THE TECHNOLOGY

The present invention relates to privacy protection technology and, in particular, to a system for shielding conversations using a distributed transducer network.

BACKGROUND

In offices, and especially in increasingly common open-space offices, violation of employees' privacy can often become an issue, as tertiary parties may overhear their conversations either intentionally or unintentionally. Because face-to-face, spontaneous conversations among workers can result in a more productive and creative workplace, relieving the concern of being overheard is important.

Existing solutions (e.g., common white noise generators) exploit products that mask conversations with background noise or other audio, which is termed "acoustic conversation shielding". In general, existing systems for acoustic conversation shielding require that the conversation be conducted in a predetermined location. Sound-masking technologies are routinely used to reduce audio distraction and protect speech privacy in the workspace, such as in an open-plan office, reception area, or a meeting room. For example, conversations in meeting rooms can be protected partly by ceiling-mounted speakers that emit masking sounds. A recent commercial product [Babble®. Sonare Technologies] uses a set of speakers to emit recorded speech to mask a user's phone conversations. However, the targets of known methods are limited to specific situations, such as telephone calls in a cubicle or discussions in a meeting room. These methods do not target spontaneous conversation that could happen at various places in a company, such as a corridor or a casual meeting space. Additionally, existing systems are typically self-contained boxes with a manual volume control. These systems output audio from a single speaker and thus are not capable of adapting to the distribution of people and intrinsic background sound in the environment.

Actuators, such as speakers and lighting, are commonly scattered throughout living environments. As communication and sensing technologies have advanced towards the vision of ubiquitous computing [Weiser, M., "The computer for the 21st century", Scientific American, 265(3), pp. 94-104, 1991], there are increasing opportunities to take advantage of such distributed actuators by using sensors that make them respond to the environment, thus increasing their utility and/or efficiency. Technologies exploiting networked clusters of sensors have been developed to realize a broad range of applications. In particular, wireless sensor networks are expected to be deployed essentially everywhere (e.g., embedded in everyday objects to realize the dream of ubiquitous computing or unobtrusively collecting data on the environment), as the cost of the deployment will drop due to their denser integration and increasing energy efficiency [Hill. J., Szewczyk. R., Woo. A., Hollar, S., Culler, D., and Pister, K., "System architecture directions for network sensors", Architectural Support for Programming Languages and Operating Systems, 2000, pp. 93-104; Crossbow Technology]. Today's prototypes of such wireless sensors are tools for building applications that explore the vision of ubiquitous sensor infrastructures [Estrin, D., Govindan, G., Heidemann, J., and Kumar, S., "Next century challenges: Scalable coordination in sensor networks", Mobile Computing and Networking, pages 263-270, 1999].

Thus far, many sensor network applications have been proposed in wildlife and outdoor monitoring, demonstrating scalability and low-power operation [Mainwaring, A., Polastre, J., Szewczyk, R., Culler, D., Anderson, J., "Wireless Sensor Networks for Habitat Monitoring," WSNA '02, September 2002, Atlanta, Ga., USA, pp. 88-97]. Other researchers have demonstrated workspace applications of sensor networks, such as determining whether conference rooms are occupied using motion sensors [Conner, W. S., Chhabra, J., Yarvis, M., and Krishnamurthy, L., "Experimental evaluation of topology control and synchronization for in-building sensor network applications", Mobile Networks and Applications, Vol. 10, Issue 4, 2005, pp. 545-562], while others have demonstrated home monitoring systems using wireless sensors [Fogarty, J., Au, C., and Hudson, S. E., "Sensing from the basement: a feasibility study of unobtrusive and low-cost home activity recognition", Proc. of the 19th Annual ACM Symposium on User interface Software and Technology UIST 2006, Montreux, Switzerland, Oct. 15-18, 2006, pages 91-100]. These applications are generally aimed at monitoring what is happening or has happened in locations where it is costly or impractical for people to observe and collect data in person.

Indoor location awareness technology is one of the major needs of ubiquitous computing. A good overview of location technologies is found in Hightower, J., and Borriello, G., "Location Systems for Ubiquitous Computing", Computer, 34(8), August 2001, pp. 57-66. Location accuracy has been improved with new technologies such as UWB (ultra wide band); for example, the Ubisense commercial system claims to have up to 15 cm accuracy with active location tag and receivers set at the corners of a room, and UWB systems appropriate for integration into lightweight sensor networks are beginning to appear [K. Mizugaki, et al, "Accurate Wireless Location/Communication System With 22-cm Error Using UWB-IR", Proc. of the 2007 IEEE Radio and Wireless Symposium, pp. 455-458]. Other recent approaches include adapting GSM [Otsason. V., Varshavsky. A., LaMarca, A., Eyal de Lara, "Accurate GSM Indoor Localization," Proceedings of the Seventh International Conference on Ubiquitous Computing (UbiComp2005), pp. 141-158, Tokyo, Japan, 2005] and power-line communication [Patel, S. N., Troug, K. N., and Abowd, G. D., "PLP: A Practical Sub-Room-Level Indoor Location System for Domestic Use," Proceedings of the 8th International Conference on Ubiquitous Computing (UbiComp2006), pp. 441-458, Orange County, USA], which both exploit existing infrastructure. Nonetheless, applications of localization technologies tend to lag and are still generally limited to established ideas such as location-aware guidance [Abowd, G. D., Atkeson, C. G., Hong, J., Long, S., Kooper, R., and Pinkerton, M. "Cyberguide: a mobile context-aware tour guide." Wireless Networks, 3(5), (October 1997), 421-433]. At a recent mobile computing conference, several location technology experts agreed that researchers in the field should focus more on applications, especially those that combine activity inference with location, instead of inventing a novel location technology [Ebling, M. R., "Hot-Mobile 2006: Mobile Computing Practitioners Interact," *IEEE Pervasive Computing*, Volume 5, Issue 4, October-December, pp. 102-105, 2006].

SUMMARY

The present invention employs a distributed sensor/actuator network to provide adaptive conversation shielding. The preferred embodiment is a sound-masking system consisting of distributed speakers and sensors that automatically adjusts to the environment. This embodiment masks voices with sound from distributed loudspeakers that adapt to the dynamic location of the conversation vs. the location of potential eavesdroppers. The invention employs sensor devices located around users, interpreting the sensor measurements and automatically performing appropriate real-time actuation. The system can be completely distributed, or it may alternatively derive some advantage from being wired to a central server.

In one aspect, the present invention is a conversation shielding system employing a transducer network having sensors that detect the location of a confidential conversation and the presence and location of a potential eavesdropper and audio output devices that produce masking sounds to shield the conversation from the eavesdropper. A controller automatically controls the operation of the audio output devices in response to data received from the sensors. The controller adjusts the masking sound type, location, and volume in response to movement of the location of the conversation to be shielded or the eavesdropper. An optional portable controller may be used for detection and/or to manually engage the system. An optional alert function may be provided that engages when the system cannot properly shield a conversation from one or more of the detected eavesdroppers.

In another aspect, the present invention is a method for shielding conversation that comprises identifying a conversation to be shielded, detecting a potential eavesdropper, automatically determining masking sound types, locations and volume that will shield the conversation, directing emission of masking sounds from at least one audio output device in order to shield the conversation, including adjusting the masking sound type, location, and volume in response to movement of the conversation or the eavesdropper, and continuing to shield the conversation until it ends or the eavesdropper is no longer detected.

BRIEF DESCRIPTION OF THE DRAWINGS

Other aspects, advantages and novel features of the invention will become more apparent from the following detailed description of the invention when considered in conjunction with the accompanying drawings wherein:

FIG. 11 illustrates the experimental deployment in operation, showing the activity at each Plug over time.

DETAILED DESCRIPTION

Figure 1:
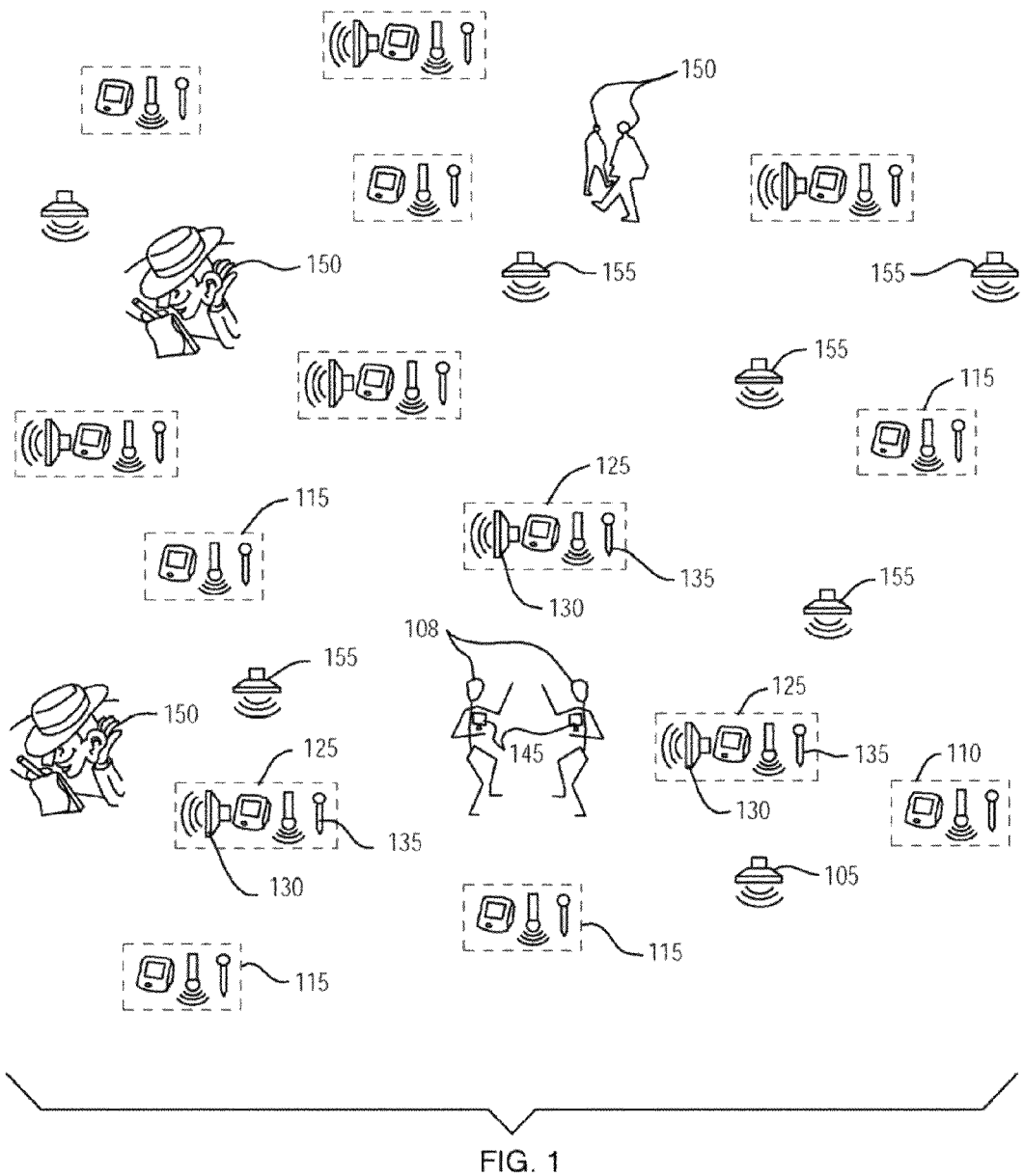
FIG. 1 is a high-level conceptual view of the configuration of an example embodiment of the present invention.

The present invention provides distributed acoustic conversation shielding through a novel application of a transducer network. It protects the privacy of spontaneous conversations in the workplace or other locations by masking the participants' voices with sound from distributed loudspeakers that adapt according to the dynamic location of the conversation with respect to the location of potential eavesdroppers. The invention employs sensor devices located around users, interpreting the sensor measurements and automatically performing appropriate real-time actuation. By exploiting sensor networks and location awareness, the present invention provides distributed, location-free acoustic conversation shielding in an automated and non-intrusive manner.

Distributed acoustic conversation shielding according to the present invention is an application of a distributed sensor and speaker network that provides a way for users to protect the privacy of conversations in places where people frequently meet and talk spontaneously. The present invention employs a distributed sensor/actuator network to provide adaptive conversation shielding. The preferred embodiment is a sound-masking system consisting of distributed speakers and sensors that automatically adjusts to the environment. This embodiment protects the privacy of spontaneous conversations by masking the participants' voices with sound from distributed loudspeakers that adapt to the dynamic location of the conversation vs. that of potential eavesdroppers. The distributed speakers, in concert with various sensors, collaboratively generate the masking sounds.

In one embodiment, the system of the present invention is activated when conversation partners push a button on a wireless wearable controller that they are wearing. Alternatively, conversations can also be autodetected by microphones on a wearable controller or near by the speakers. The locations of potential eavesdroppers are determined by a distributed sensor array. In the prototype, common motion sensors are employed, but any of the many other occupancy-detection sensors known in the art may be advantageously employed in the present invention. Background sound is faded up on speakers located between the eavesdroppers and the conversation. Feedback control can be added so that intelligibility in the vicinity of the eavesdroppers is minimized, while annoyance and distraction to both people in the space and the conversation partners is minimized. The system may be extended to handle multiple conversations and potential eavesdroppers in a large space. For super critical conversations, the audio system may optionally alert the conversing partners to the presence of listeners who are too close for the masking system to work adequately. The preferred embodiment of the system employs automatic control and is distributed throughout a large area. For practical deployment, for example, the system may be, but is not limited to, integrated into the distributed speakers that are already installed for public address systems in workplaces.

FIG. 1 is a high-level conceptual view of the configuration of an example embodiment of the present invention. In this view of the instrumented space, speaker 105 nearest to conversants 108 is used to output masking sound. Speaker 105 may be a "smart" speaker with microprocessor on a digital network (wired or wireless), a simple speaker analog wired to a central audio server, or any other suitable audio output device known in the art. Nearby sensor array 110, preferably including some kind of person or motion detector to sense potential eavesdroppers, measures background audio, including audio coming from the masking system and potentially the conversation to be masked, for self-calibration and potential auto-detection of conversations. Sensor array 110 is preferably part of a larger sensor network containing multiple sensor arrays 115, which may optionally have an RF receiver or transceiver to talk with the wearable nodes on the conversing partners and "localize" them. Alternative speaker/sensor arrays 125 each have speaker 130 with sensors 135 added, so that they may both mask and sense, being effectively a combination of speaker 105 and sensor array 110. This configuration was employed in the prototype implementation. There may be some disadvantages to having the microphone co-located with a speaker (e.g., if a masking sound is being made, it is hard to hear other sounds), but not all speakers may be engaged, and the microphone may be used during gaps in the masking sound at each speaker. Conversing partners 108 are having their conversation masked by speaker 105. There may be several sets of these people, or just one set. Ideally, a scalable system is adaptable to multiple conversations and listeners. Optional "wearable controller" 145 features a button to engage the masking system, a microphone to sense the conversation, optionally an IR system to detect the partner being conversed with, and a radio to communicate with the greater system. While wearable controller 145 is optional (e.g., a dense sensor array might be able to autodetect conversations and adapt the screen to them), the ability to selectively engage the system upon a button press may be advantageous. In a preferred embodiment, the system adapts to a relatively arbitrary distribution of potential listeners or eavesdroppers 150, within its limits to mask. If masking would not be effective, conversants 108 may optionally be warned via an alert issued by wearable controller 145 or by any of nearby speakers 105, 130, 155.

Figure 2:
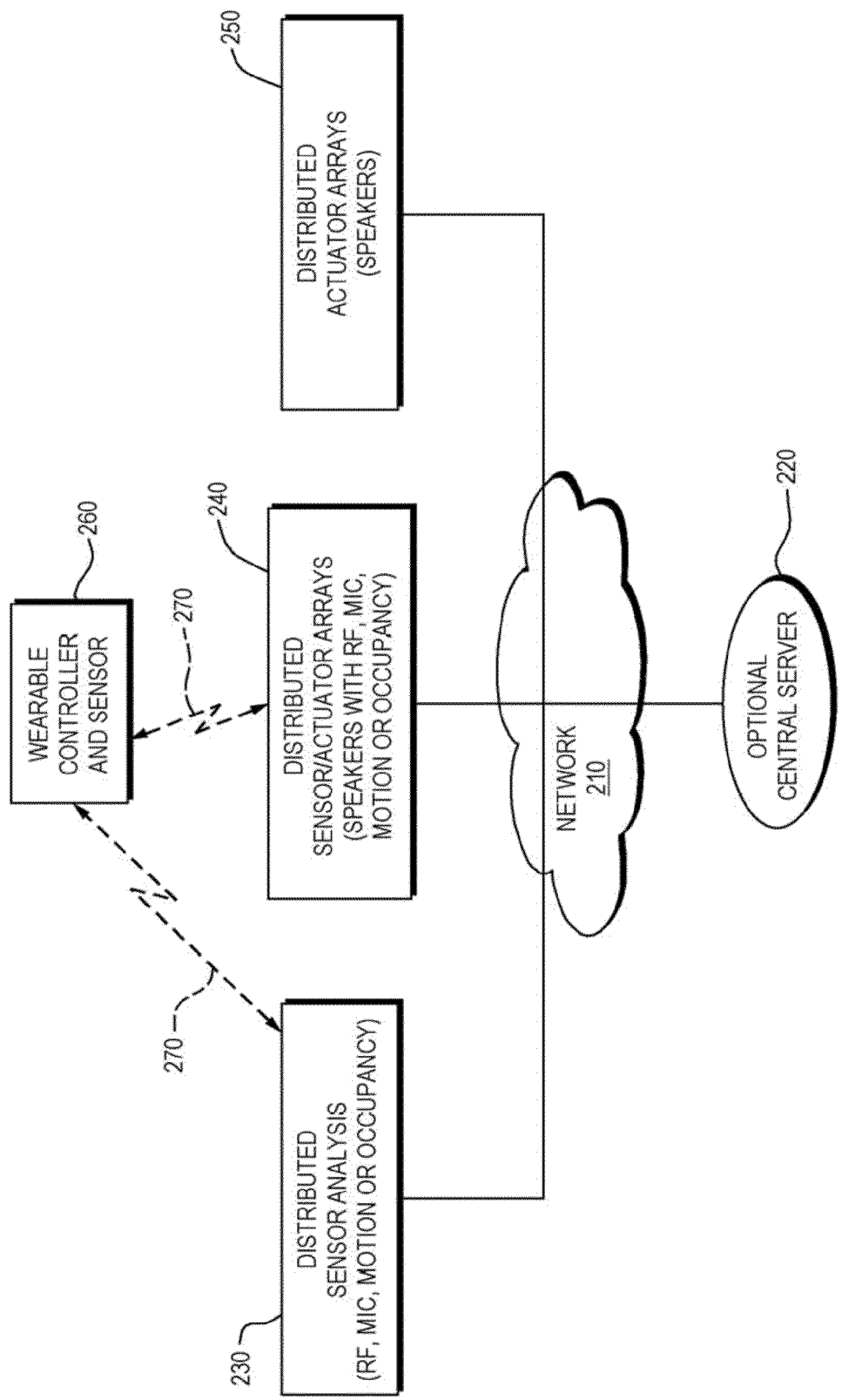
FIG. 2 is a block diagram of an example embodiment of a system according to one aspect of the present invention.

FIG. 2 is a block diagram of an example embodiment of a system according to one aspect of the present invention. In the embodiment of FIG. 2, everything resides on a peer-peer network 210 with optional central server 220. The system can be completely distributed, or it may alternatively derive some advantage from being wired to central server 220. The system of FIG. 2 is comprised of a mixture of distributed sensor arrays 230 (RF, microphone, motion, or occupancy), distributed sensor/actuator arrays 240 (speakers with RF, microphone, motion, or occupancy), and distributed actuator arrays 250 (speakers), but it will be clear to one of skill in the art that systems according to the present invention may be advantageously designed with only, or without, any one of those elements, or with any combination of those elements. Optional elements in the system of FIG. 2 include portable controller and sensor 260, one or more wireless links 270, one or more networks 210 and central server 220.

A prototype implementation has been made that employs the "Plug" sensor network platform as a networked speaker to emit the masking sounds. Details regarding the Plug's functionalities may be found in Lifton, J., Feldmeier, M., Ono, Y., Lewis, C., and Paradiso, J. A., "A Platform for Ubiquitous Sensor Deployment in Occupational and Domestic Environments," *International Conference on Information Processing in Sensor Networks* (*IPSN* 07), Cambridge, Mass., 25-27 Apr. 2007, pp. 119-127, and U.S. Pat. App. Pub. 2008/0094210, which are herein incorporated by reference in their entirety. The Plug is designed as a ubiquitous sensing and actuation device for homes and offices. It is modeled on a common electrical power strip, and it has various sensors, a wireless transceiver, and a speaker. In their role as power strips, Plugs have access to ample energy without batteries and already reside everywhere in homes and offices. A network of Plugs is an ideal candidate to bootstrap a backbone for ubiquitous computing, where Plugs communicate with wireless devices in the vicinity such as active badges and tags. Although not currently implemented in the prototype, power line communication (PLC) is an ideal network interface for the Plug, although it will be clear to one of skill in the art that many other interfaces are possible and suitable for use in the present invention. While for convenience all nodes described in relation to this application are called "Plugs", it will be clear to one of skill in the art that many other devices and configurations of devices known in the art may be advantageously employed in the present invention. Although the rich resources provided by the Plugs ease development, production platforms for such an audio masking application could be considerably streamlined and integrated into standard ceiling public address (PA) speaker deployment.

Figure 3:
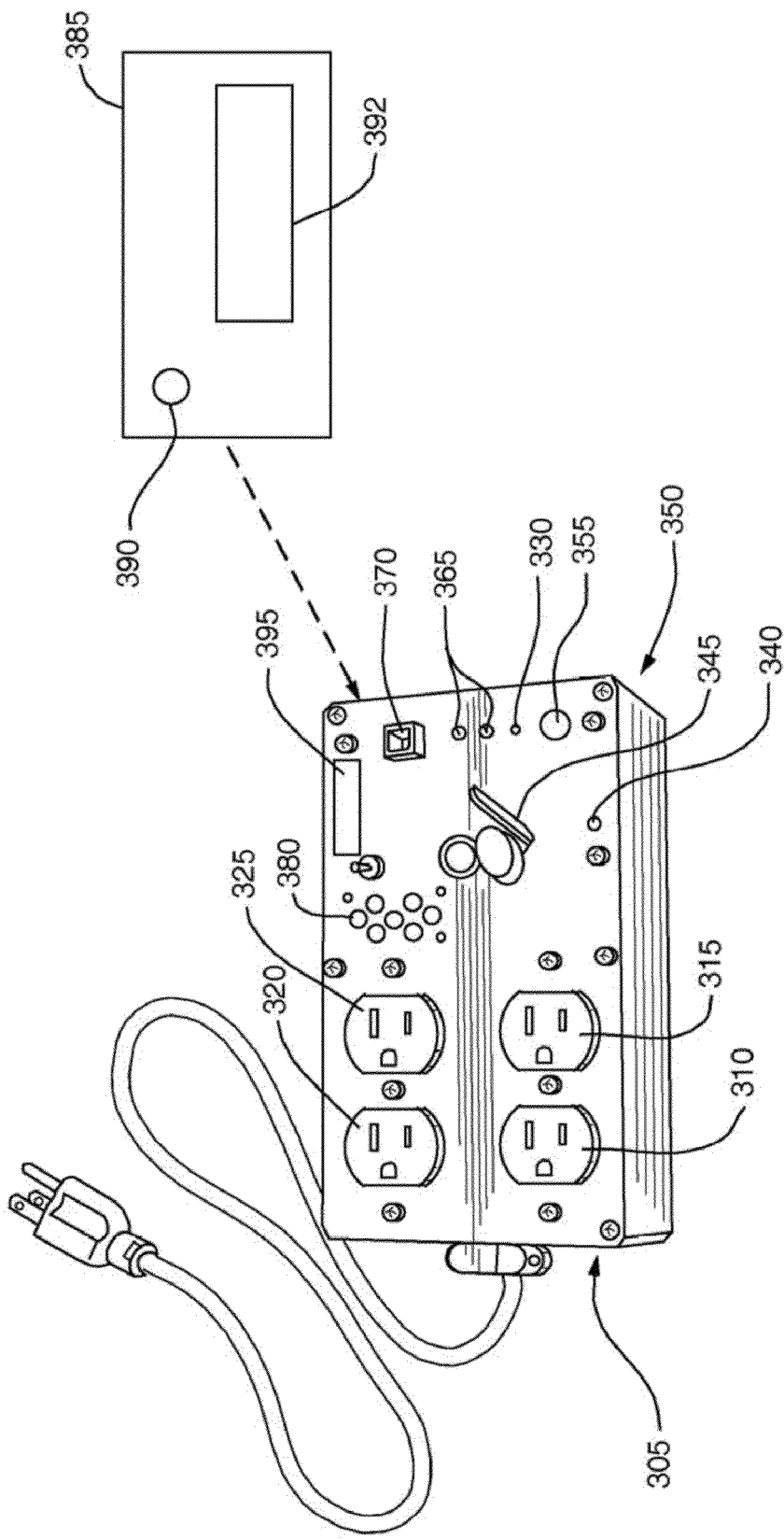
FIG. 3 depicts an embodiment of a Plug sensor network platform prototyped as an electrical power-strip with a sensor array, according to one aspect of the present invention.

FIG. 3 depicts a Plug sensor network platform prototyped as an electrical power-strip with a sensor array. In the embodiment employed in the prototype, the Plug has a 32 bit ARM7 microcontroller 305 (Atmel AT91SAM764S) running at 48 MHz, four independently-controlled outlets 310, 315, 320, 325 with current and voltage monitors (ARM 305 can also turn each outlet on and off), pushbutton 330, phototransistor 340, 2.4 GHz wireless transceiver (Chipcon CC2500) 345, piezoelectric cantilever vibration sensor 350, microphone 355, two programmable LEDs 365, USB 2.0 port 370, and speaker 380. Expansion board 385 that contains a passive infrared (PIR) motion sensor 390 and an SD memory card reader 392 is connected via expansion port 395.

In the prototype embodiment, cantilever vibration sensor 350 and the PIR motion sensor are used to detect a person nearby. SD-cards are used to store audio clips that the Plug's speaker plays as masking sounds. USB port 370 is used to connect the Plug to a PC so that the status of the Plug network may be monitored on the screen of the PC. Although the rich resources provided by the Plugs ease development, production platforms for such an audio masking application could be considerably streamlined and integrated into standard ceiling public address (PA) speaker deployment. In the prototype application, the cantilever vibration sensor and the PIR motion sensor are used to detect a person nearby. SD-cards are used to store audio clips that the Plug's speaker plays as masking sounds. The USB port is used to connect a Plug to a PC so that the status of the Plug network can be monitored on the PC screen.

Figure 4:
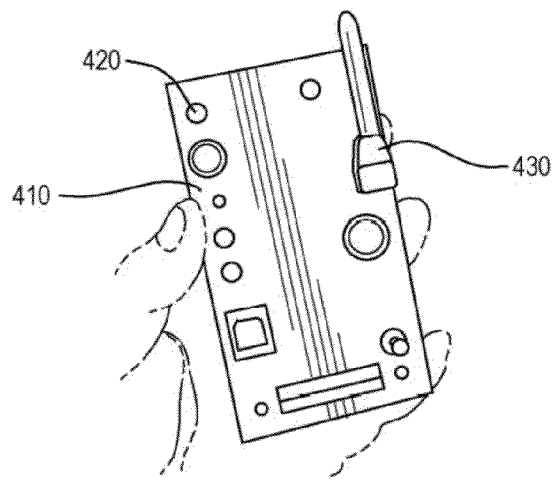
FIG. 4 depicts an embodiment of a prototype wearable controller according to one aspect of the present invention.

To control the system remotely, a battery-operated mobile device was prepared that bears the same functionality as the Plug (microcontroller, wireless transceiver, peripherals) without power functions and full sensing. This mobile device has been termed a "wearable controller", and it is assumed that users wear it when this application is running. FIG. 4 depicts an embodiment of a prototype wearable controller according to one aspect of the present invention. The prototype wearable controller features button 410 to launch the masking operation. It also has microphone 420 to detect the user's conversation and transceiver 430 for wireless communication with the masking system. This device provides a simple one-button user interface to control the masking audio. Its microphone can be used to detect conversation, and is designed for users to wear it over a shirt or jacket like a badge.

In the prototype embodiment, the Plug reads 8 bit/8 Hz PCM (Pulse-Code Modulation) audio data from the SD-card, and drives its speaker with PWM (Pulse-Width Modulation), as the ARM has no onboard DAC. Three types of masking sounds that a user can launch with the wearable controller were tested. One is a pre-recorded conversation, where the Plugs repeatedly play audio samples from the SD card. Another sound is a shuffled conversation, i.e., a continuous play of randomly-selected 640 millisecond slices of a pre-recorded conversation. The other sound is white noise, which is synthesized by the micro-controller. The volume of the speaker has three levels, which are named LOW, MEDIUM, and HIGH. In the Plug's firmware, the amplitude of the PWM modulation is set differently by each level; comparing amplitudes, volume HIGH is twice as large as volume MEDIUM and volume LOW is half as large as volume MEDIUM.

In an example scenario suitable for use of the present invention, an office worker happens to meet one of his colleagues, a team member of a project, in the open space of their office area, and they start to chat about their project. He notices that the content of the conversation is getting rather confidential to people outside their team. He pushes a button on his mobile device to trigger the acoustic conversation shielding application, at which point various speakers surrounding them start to emit a masking sound to prevent others from overhearing the conversation. When the conversation is over, he pushes the button again to stop the masking. Even if he forgets to stop the speakers explicitly, the mobile device, embodied as a badge, detects the end of conversation with its microphone and/or the dispersal of its participants via an IR proximity detector [Laibowitz, M., et al., "A Sensor Network for Social Dynamics," *Proc. of the Fifth nt. Conf on Information Processing in Sensor Networks* (*IPSN* 06), Nashville, Tenn., Apr. 19-21, 2006, pp. 483-49] and turns the speakers off. Alternatively, conversations may be autodetected by noting face-face proximity via IR, along with alternating vocal cadence in the wearable microphones.

To realize this scenario, the distributed audio system needs to thwart nearby listeners without disturbing people in the conversation or excessively irritating others in the area. Therefore, the volume of each speaker should be turned up only when it is located between the conversation source and someone nearby who is a potential listener. The masking sounds form a virtual barrier to acoustically isolate people involved in the conversation. Ideally, the volume of each speaker is automatically adjusted to the minimum needed to blind potential eavesdroppers. Although all speakers near potential listeners could be driven with masking sounds, the "cocktail party effect" [Arons, B., "A Review of The Cocktail Party Effect," *Journal of the American Voice I/O Society* 12, Jul. 1992, pp 35-50] suggests that masking sources along the direction between eavesdroppers and the conversation are most effective.

Figure 5:
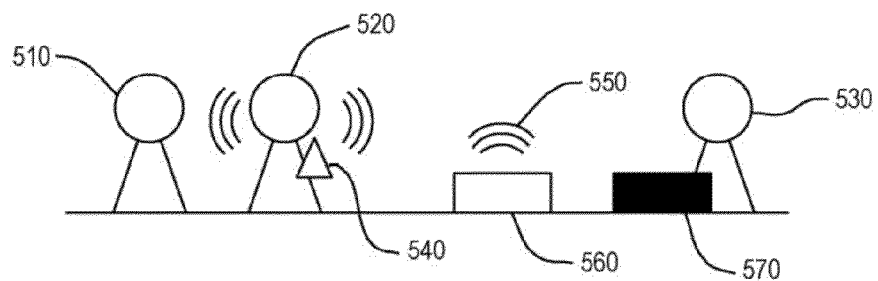
FIG. 5 is a simplified diagram of an embodiment of a conversation masking system in operation, according to one aspect of the present invention.

FIG. 5 is a simplified diagram of an embodiment of a conversation masking system in operation, according to one aspect of the present invention. Two people (left) converse while a listener (right) approaches. It is assumed that the Plugs make masking sounds when another Plug detects a person nearby, as depicted in FIG. 5. This potential eavesdropper, sometimes called a "listener", hears both the conversation and the masking sound. In FIG. 5, two people 510, 520 are talking while another person 530 approaches. Person 520 wears mobile controller 540 that invokes masking sound 550 from Plug 560. Plug 570 detects listener 530. The intelligibility of the conversation to listener 530 is decreased by the masking sound.

To evaluate the effectiveness and performance of the masking sound, the intelligibility of the conversation to the listener must be considered. Signal-to-Noise Ratio (SNR) is often used as an index of intelligibility in the research of auditory perception [Miller G. A., "The masking of speech", *Psychological Bulletin* 44(2), pp. 105-129, 1947; Assmann P. F., Summerfield A. Q., "The perception of speech under adverse conditions." In S. Greenberg, W. A. Ainsworth, A. N. Popper and R. Fay (Eds.) *Speech Processing in the Auditory System*. Springer-Verlag, New York. 2004, pp. 231-308; Brungart D. S., "Informational and Energetic Masking Effects in Multitalker Speech Perception," In Divenyi, P. (Eds.), *Speech Separation by Humans and Machines*, Kluwer Academic Publishers, 2005, pp. 261-267; Brungart, D. S., Simpson, D. B., Ericson, M. A., and Scott, K. R., "Informational and energetic masking effects in the perception of multiple simultaneous talkers", *J. Acoust. Soc. Am.* 110(5), pp. 2527-2538, 2001; Brungart, D. S., "Informational and energetic masking effects in the perception of two simultaneous talkers," *J. Acoust. Soc. Am.* 109(3), pp. 1101-1109, 2001]. SNR is the ratio of the sound power of the target speech to that of noise. The masking sounds increase noise energy. A pioneering study of masking sound showed that intelligibility decreases monotonically as SNR decreases [Miller G. A., "The masking of speech", *Psychological Bulletin* 44(2), pp. 105-129, 1947].

It has been suggested that masking sounds having characteristics similar to the target speech decrease intelligibility effectively; speech by the target person masks better than the speech by a different person, a different sex, or noise [Assmann P. F., Summerfield A. Q., "The perception of speech under adverse conditions," In S. Greenberg, W. A. Ainsworth, A. N. Popper and R. Fay (Eds.), *Speech Processing in the Auditory System*, Springer-Verlag, New York. 2004, pp. 231-308; Brungart D. S., "Informational and Energetic Masking Effects in Multitalker Speech Perception," In Divenyi, P. (Eds.), *Speech Separation by Humans and Machines*, Kluwer Academic Publishers, 2005, pp. 261-267; Brungart, D. S., Simpson, D. B., Ericson, M. A., and Scott, K. R., "Informational and energetic masking effects in the perception of multiple simultaneous talkers", *J. Acoust. Soc. Am.* 110(5), pp. 2527-2538, 2001]. For example, the score of an intelligibility test in Brungart's study is decreased from 80% to 40% as SNR was decreased from 6 bB to 0 dB when they used speech by the same person as a masking sound. In this application, it might be assumed that users record their speech in advance so that Plugs can use snippets of their speech or exploit a model of their vocal characteristics as a masking sound when the application is invoked.

SNR (Signal-to-Noise Ratio) was used as an index of intelligibility to evaluate the performance of the system of the invention. Measured SNR can be used to adaptively servo the volume of the masking sounds. Masking performance can be measured as SNR (Signal-to-Noise Ratio), which is calculated by the network of microphones. The results of experiments suggest that it is beneficial to introduce feedback control into the application, where the volumes of the masking sounds are continuously controlled by using distributed microphone measurements. There are ample opportunities to advance the proposed application by integrating various fields of research, including psychoacoustics, sensor networks, control theory, and location awareness.

An experiment was conducted to estimate SNR at the position of the listener in an experimental setting where the volume of the masking sound was set at various levels and the distances between the listener and the conversation was changed. Two streams of audio measurements were used; one from the wearable controller's microphone and the other from the microphone of a Plug that was put at the listener's position. A high-quality speaker driven by a PC was used to mimic the conversation, and the wearable controller was put close to this speaker. Plugs were placed at 2, 3, 4, and 5 meters away from the speaker (assuming that the listener is in this position), and another Plug was placed in the middle between the conversation and the listener to provide a masking sound. A speech corpus consisting of short sentences recorded by three males and three females [*A noisy speech corpus (NOISEUS), University of Texas at Dallas*] was employed for both the target conversation played by the PC speaker and the masking sound. The sentences are called "Harvard psychoacoustic sentences," which were developed for subjective measurements of speech [IEEE Recommended Practice for Speech Quality Measurements, *IEEE Transactions on Audio and Electroacoustics*, Vol. 17, pp. 227-46, 1969]. The PC speaker and the Plug repeatedly played excerpts from the speech corpus. The PC put a short pause of around 5 seconds between each "conversation" sentence. With a commercial sound level meter located 30 cm from the acoustic source, the peak loudness of the speaker was around 75-85 and 70-80 dB SPL (A) for the PC speaker and the Plug's speaker with "MEDIUM" volume, respectively. The loudness of the Plug's speaker was decreased by around 3 dB SPL and increased by around 3 dB SPL at "LOW" volume and at "HIGH" volume, respectively. SNR was calculated with 90-second recordings of microphone measurements when both speakers were turned on.

Figure 6A:
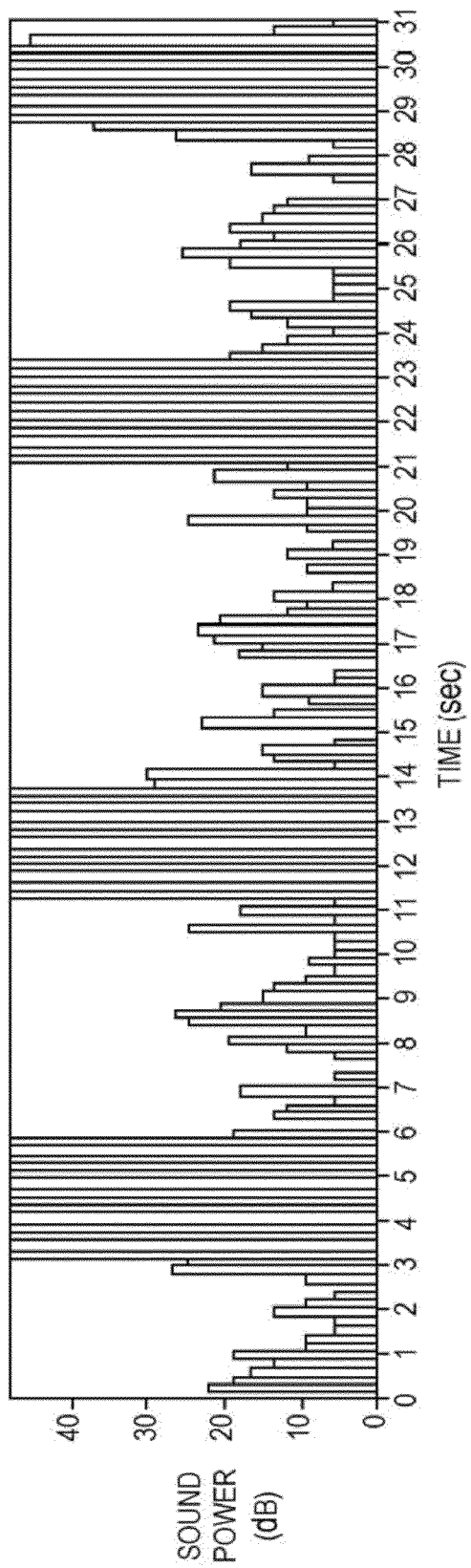
FIGS. 6A-C depict experimental results for the sound power at the wearable controller and a Plug representing the listener, with and without masking, using a prototype of the present invention.
Figure 6B:
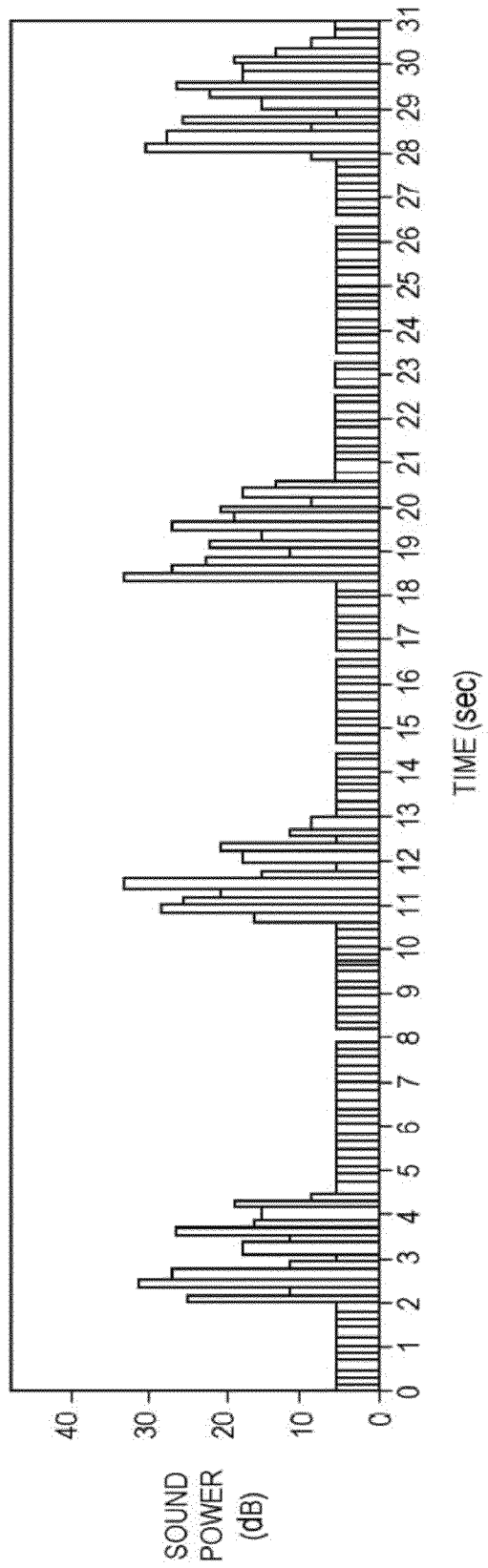
Figure 6C:
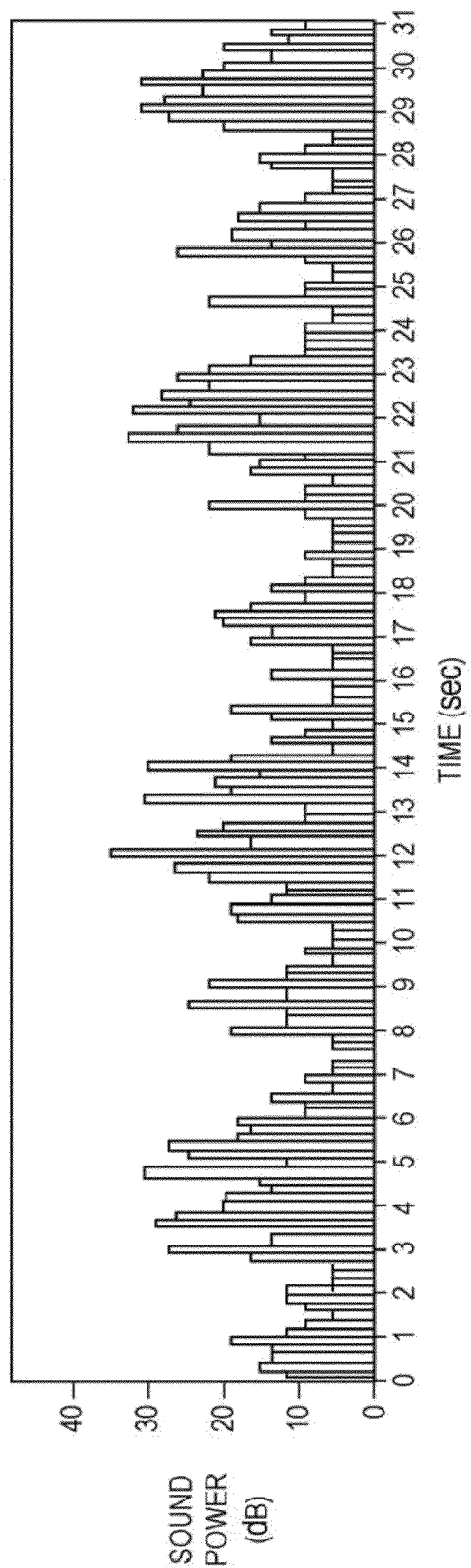

FIGS. 6A-C depict experimental results for the sound power at the wearable controller and the Plug representing the listener when the distance was 5 m and the volume of the Plug was LOW. The sound power was calculated every 192 milliseconds in each microcontroller, at which 8 bit/8 Hz microphone measurements were used. FIG. 6A depicts sound power measured by a wearable controller at the position of a conversation. As shown in FIG. 6A, the wearable controller's microphone is saturated in the presence of speech. The presence and absence of conversational speech is thus easily detected by setting a threshold on sound power at the wearable controller. A Plug was placed in the middle between the conversation and the listener to provide a masking sound. FIG. 6B and FIG. 6C show the sound power measured by a Plug at the position of a listener without and with masking, respectively. The distance between the conversation and the listener was 5 m and the volume of the masking sound in FIG. 6C was LOW. To calculate SNR, two measurements of sound power, the target speech and induced noise, are needed at the listeners position. Noise power was calculated as a time average of the sound power during the absence of the conversational speech. The power of the target speech was calculated by subtracting the noise power from a time average of the sound power during the presence of the speech in the conversation. As seen in FIG. 6C, the masking sound dominated the room's ambient noise sources.

Figure 7:
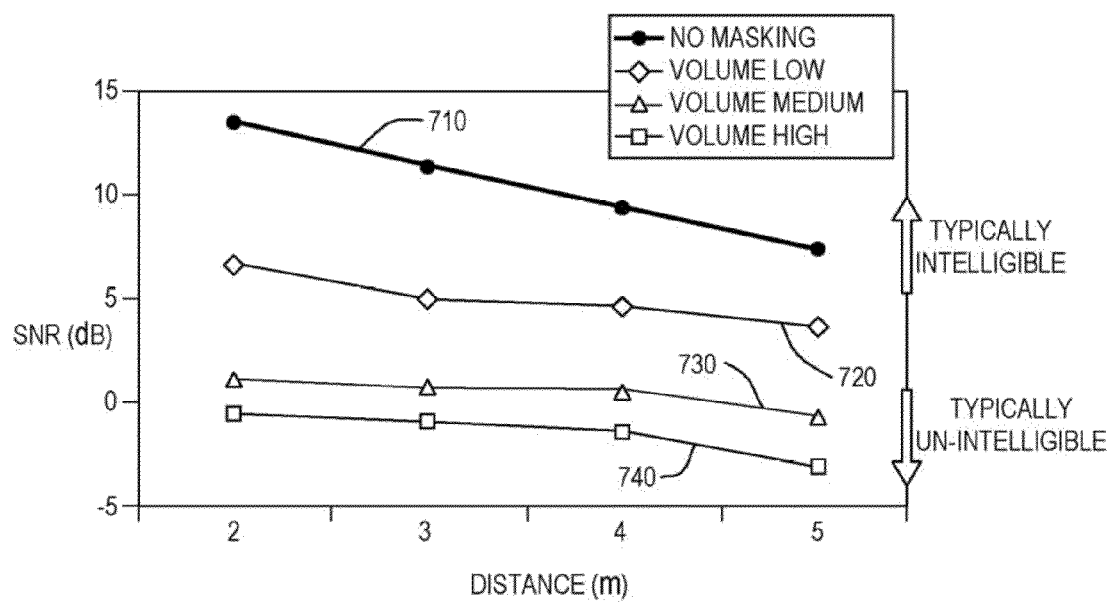
FIG. 7. graphically depicts the calculated Signal-to-Noise Radio (SNR) for an example embodiment when the distance between the conversation and the listener is 2, 3, 4 and 5 m and the volume of the masking sound is LOW, MEDIUM, and HIGH.

FIG. 7 graphically depicts the calculated SNR when the distance is 2, 3, 4 and 5 m and the volume of the masking sound is ZERO 710, LOW 720, MEDIUM 730, and HIGH 740. SNR with no masking sound is also shown. 90-second sound power measurements at the wearable controller and a Plug are used to calculate SNR. SNR decreases as the distance or the volume of the masking sound increases. If the Brungart et al. psychoacoustic study that claims intelligibility drops when SNR decreases from 6 dB to 0 dB is applied, this result might be interpreted as follows: The masking sound decreased the intelligibility especially when the volume was MEDIUM 730 or HIGH 740, while the listener could rather understand the conversation when no masking sounds were presented. SNR is seen to decrease with distance and the volume of the masking sound. The psychoacoustic study also suggests that the decrease of the intelligibility was not observed when SNR decreased beyond 0 dB when speech was used as a masking sound. If this principle is applied to the present invention, masking sounds with HIGH 740 volume are more than needed for masking purposes across these distances, and MEDIUM 730 volume was sufficient out to 5 m, for example. As emitting redundant sound power into the environment is undesirable, it is best to keep the volume of the masking sound limited.

It is assumed that Plugs and wearable controllers know the two dimensional (x,y) coordinate of their location in the environment. To test the application in a location-aware setting, the Plugs read their assigned locations from the SD-card at the time of booting. These pre-fixed coordinates were used in the deployment experiment. RSSI (Radio Signal Strength Indicator) based location estimation [Bahl, P., and Padmanabhan, V., "RADAR: An In-Building RF-based User Location and Tracking System," *Proc. IEEE INFOCOM* (Tel-Aviv, Israel, March 2000), Vol. 2, pp. 775-784] could be implemented into Plugs and wearable controllers, assuming that a set of anchor plugs have pre-fixed coordinates. An RSSI-based location algorithm is implemented on the family of wireless transceivers that Plug uses [Taubenheim, D., Kyperountas, S., and Correal, N., *Distributed Radiolocation Hardware Core for IEEE* 802.15.4]. As eavesdroppers may not be wearing badge transmitters, listener locations are roughly estimated in the system by the Plugs' vibration and PIR motion sensors. Such sensors, in a sufficiently dense deployment, have been shown to be able to track occupants through a building provided enough state is retained [Wren C. R., and Rao, S. G., "Self-configuring, lightweight sensor networks for ubiquitous computing," *The Fifth International Conference on Ubiquitous Computing: Adjunct Proceedings*, 2003, pp. 205-6; MERL Technical Report TR2003-24].

Decentralized control that exploits local computation is a natural choice for a distributed system, since it does not depend on either a central controller or a central storage, which could become a bottleneck to the system's scalability and response. Therefore, the speaker of the Plugs is controlled in a decentralized manner, letting each Plug manage its own speaker for faster response and easy expandability when users introduce additional Plugs into the system. To separate control code from lower-level routines (such as communicating with neighbor Plugs) in the firmware, "neighbor caches" [Lifton, J., Seetharam, D., Broxton, M., and Paradiso, J., "Pushpin Computing System Overview: a Platform for Distributed, Embedded, Ubiquitous Sensor Networks," *Proceedings of the First International Conference on Pervasive Computing*, pp. 139-151, Aug. 26-28, 2002] were prepared, a table consisting of the latest sensor measurements of the neighbor Plugs. The response of a Plug's speaker is developed by consulting this neighbor cache to account for the state of other Plugs in the neighborhood.

Table 1 shows a Plug's neighbor cache as prepared for each nearby Plug. It includes sensor measurements (microphone, PIR, and vibration) and the status of the speaker (type and volume of generated sound). It also keeps the (x,y) coordinate, an address that is unique among neighboring Plugs, and the RSSI and time stamp taken when receiving the last radio packet. Plugs update their neighbor cache when they receive a packet from another Plug. Every 192 milliseconds, each Plug calculates the averaged sound power from 8 bit/8 Hz microphone measurements. After obtaining these values eight times, the Plug transmits a packet that contains the sequence of sound powers with PIR and vibration sensor measurements averaged over the last 1.5 seconds. The packet also contains the coordinate, the status of the speaker, and the node address. When a Plug receives this packet, it updates the values of the neighbor cache corresponding to the transmitting node's address. Table 1. Neighbor cache includes sensor measurements and status of the speaker of each Plug in the neighborhood.

TABLE 1

| Item | Description |
| --- | --- |
| Address | Unique ID among neighboring devices |
| Microphone | Averaged sound power |
| Passive IR (PIR) | Is PIR activated? |
| Vibration | Is vibration detected? |
| Speaker Volume | Volume of the Speaker |
| Speaker Sound | Type of Speaker Sound |
| Location | (x, y) coordinate |
| RSSI | Radio Signal Strength Indicator |
| Time Stamp | Time when the last packet was received |

Figure 8:
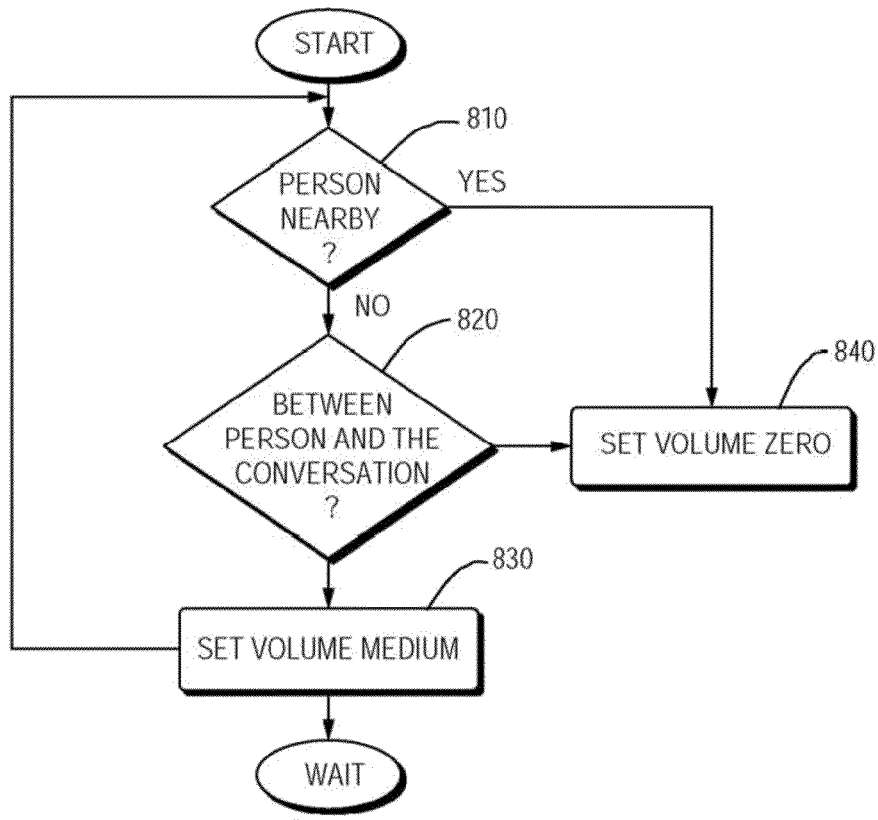
FIG. 8 is a flowchart conceptually depicting audio control code for a experimental deployment of an embodiment of the present invention.

The control code managing the speaker of each Plug is depicted conceptually in the flowchart shown in FIG. 8. This procedure was designed so that Plugs make a sound barrier between the conversation and listeners. The routine begins by checking whether the Plug has detected 810 an active PIR or a vibration sensor, which is interpreted as someone nearby. If nobody is detected, it checks 820 whether (i) there are any neighbor Plugs that have detected a person nearby and (ii) the Plug is located between the neighbor and the wearable controller. The code then estimates the relative positions of Plugs and wearable controller from the coordinate values in the neighbor cache. If both (i) and (ii) are true, the code turns up the volume 830 to MEDIUM so that the Plug becomes a part of the sound barrier. Otherwise, the code keeps the volume zero 840. This process is repeatedly invoked to reflect any change in the environment.

Figure 9:
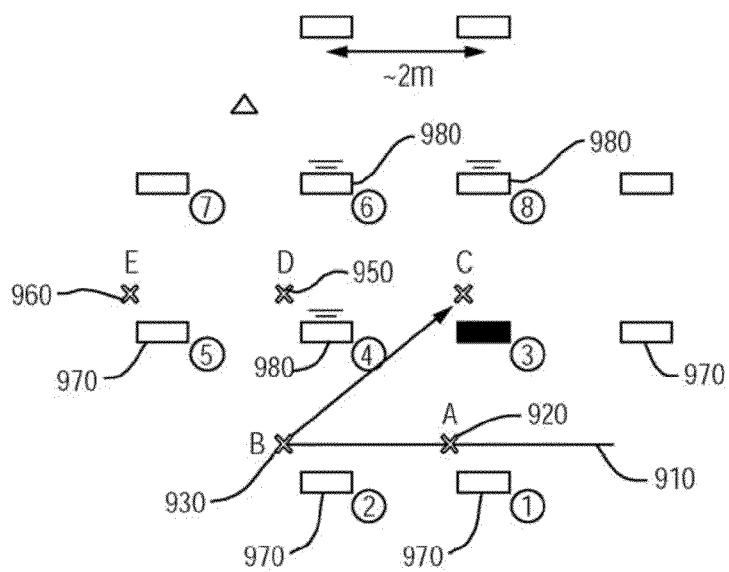
FIG. 9 is screenshot from the monitoring software on a PC, for an exemplary embodiment of the present invention having 12 Plugs and a mobile controller.

Twelve Plugs were deployed in lab space on the $3^{rd}$ floor of MIT Media Laboratory to test this application. Another Plug was connected to a PC to monitor the status of the 12 participating Plugs. FIG. 9 is a snapshot from the monitoring software running on the PC, where each Plug is shown as a rectangle. Plugs are deployed at positions shown in the figure, where each Plug is about 2 meters away from its neighbors. These locations were cached as (x,y) coordinates in each Plug and in the mobile controller. A filled rectangle indicates that the Plug has detected a person nearby with the active PIR or vibration sensor, while horizontal lines above a rectangle indicate that the Plug is making a masking sound. It was confirmed experimentally that the sound barrier is adjusted as a person walked through the environment, such as, for example, along the path 910 from positions A 920, B 930, C 940, D 950, to E 960 in FIG. 9. Plugs 970, 980 in the appropriate positions emitted a masking sound. The screenshot shown in FIG. 9 was captured after a user activated the masking system with the wearable controller and one of the Plugs detected a listener who was at position C 940. At the time of the screenshot, 3 Plugs 980 were making a masking sound to shield the users' conversation.

To evaluate whether the sound barrier successfully masked the conversation, SNR was calculated at positions A 920, B 930, C 940, D 950, and E 960 in FIG. 9. A high-quality PC speaker was employed to mimic the conversation and put another Plug at each listener's position for the SNR measurement. The same speech corpus was used for the content of the conversation and the masking sound. A wearable controller was placed beside the PC speaker to detect the presence of speech in the conversation. As before, SNR was estimated from two streams of microphone measurements for 90 seconds; one from the wearable controller's microphone and the other from the microphone of the Plug at the listener's position.

Figure 10A:
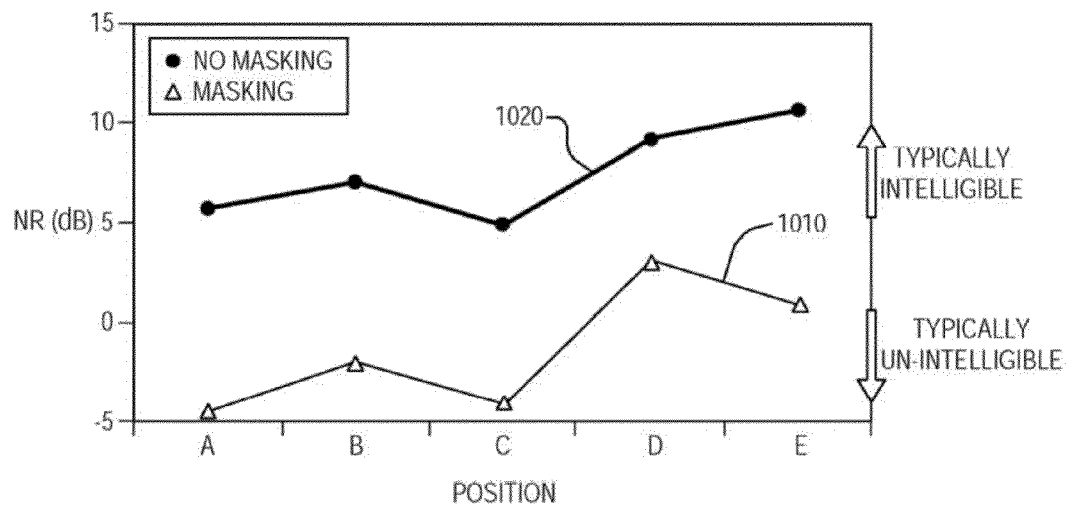
FIGS. 10A and 10B are graphical presentations of experimental results from the experimental deployment.
Figure 10B:
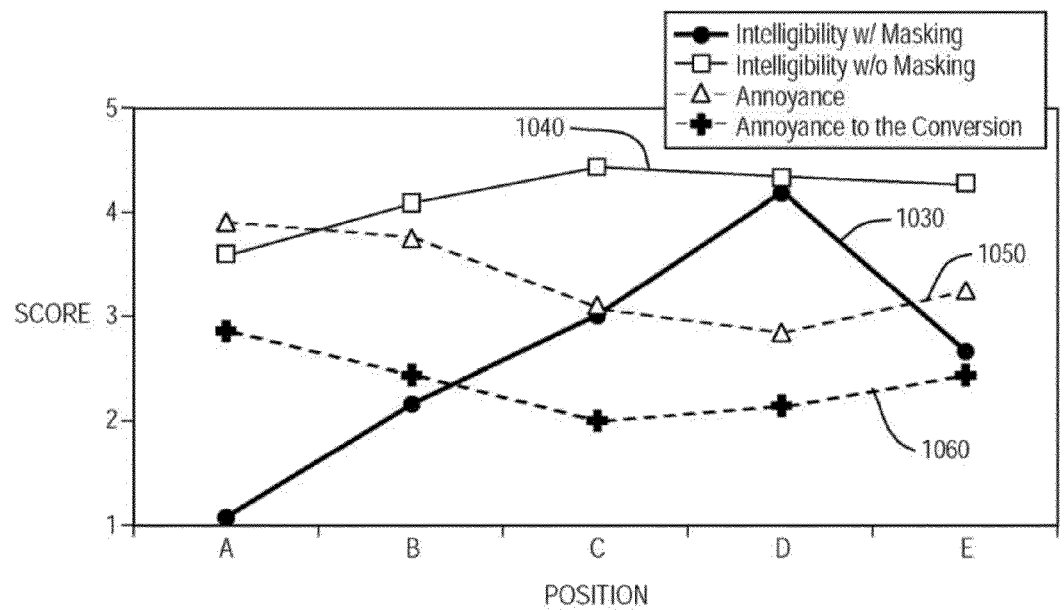

The results of the experimental evaluation are shown in FIGS. 10A and 10B. The masking sounds decreased SNR by 5-10 dB at each location. If the Brunart psychoacoustic study, saying that intelligibility drops when SNR is decreased from 6 dB to 0 dB and speech is unintelligible below 0 dB, is employed, the result could be interpreted as follows. At the positions D and E, which are closer to the conversation, SNR was between 0 dB and 6 dB, meaning the intelligibility was decreased but it could be decreased more if the volume of the masking were increased. At positions A, B, and C, which are more than 5 m distant from the conversation, SNR dropped below 0 dB, meaning the masking sound decreased intelligibility sufficiently and may be louder than needed. FIG. 10A graphically presents the calculated Signal-Noise Radio (SNR) at positions A, B, C, D, and E when masking sounds are present 1010 and not present 1020. 90 second recordings of the sound power measurements at the wearable controller and at a Plug are used to calculate SNR. FIG. 10B graphically presents results of human subject tests quantifying intelligibility with 1030 and without masking 1040 and annoyance to people at the eavesdropper's location 1050 and distraction to the conversing individuals 1060 as a function of listener position.

In order to test this indication in more detail, audio of a conversation was recorded (again extracted from the Coordinated Response Measure (CRM) speech corpus of Brungart et al. [Brungart D. S., "Informational and Energetic Masking Effects in Multitalker Speech Perception," In Divenyi, P. (Eds.), *Speech Separation by Humans and Machines*, Kluwer Academic Publishers, 2005, pp. 261-267; Brungart, D. S., Simpson, D. B., Ericson, M. A., and Scott, K. R., "Informational and energetic masking effects in the perception of multiple simultaneous talkers", *J. Acoust. Soc. Am.* 110(5), pp. 2527-2538, 2001]) with and without masking, as heard at each location of FIG. 9. This was then played back through earbuds for seven subjects, who rated the conversation's intelligibility on a scale of 1-5 at each position. They also rated their annoyance at the masking sound for audio recorded at the positions of the eavesdropper and the conversation. Evaluating this system with sound recorded at each position isn't completely faithful, as, for example, it eliminates any directional cues that the listener picks up by moving his or her head, etc. On the other hand, this technique guarantees a stable acoustic environment, even without a test space with consistent background noise.

Results, averaged across all users, are shown in FIG. 10B, where the intelligibility of the masked conversation can be seen to steadily increase as the user approaches the conversation. The speech was deemed as understandable as the unmasked audio when one approaches to within circa 3 meters, due to the fewer number of masking speakers activated and louder primary sound level (note that, although points D and E were roughly equidistant from the conversation, users seemed to rank position E less understandable, probably because of adaptation effects—as all they experienced the audio stream progressing from points E to A, their ears became better accustomed to the quality of speech after point E). Positions further from the conversation than point C (roughly 5 meters away) were rated less than half intelligible, which is somewhat in accordance with the SNR predictions at FIG. 10A.

The users also related a subjective "level of annoyance or distraction" at each potential eavesdropper position (here assuming that the "eavesdroppers" are actually other employees hard at work), as well as the amount of distraction from the masking sounds present at the conversation. FIG. 10B indicates that annoyance drops a bit as the eavesdroppers approach the conversation, again because there are fewer speakers making masking sound. The amount of distraction to the conversing partners is consistently rated below midpoint and is always well below the annoyance to the eavesdropper.

FIG. 11 illustrates results form the system in operation, where the plug speakers are seen to automatically switch as the user walks the course of FIG. 9. This system is essentially open loop the masking audio played at each node is determined solely by activity detected by the motion sensors in the network and the relative position of eavesdropper vs. conversation. Note that only one level of masking audio can currently be selected. The performance of the system will improve significantly if the masking audio at each speaker can be continuously varied under distributed audio feedback control. FIG. 11 depicts microphone amplitude for Plugs 1-8 as the listener walks from A-B-C-D-E in FIG. 9, showing dynamic response of masking audio at each plug to changes in the listener's location. The microphone signal 1110 (solid curves) tends to saturate when the plug's speaker is activated (indicated by dotted line2 1120). Motion sensor detection of the listener is indicated by bold bars 1130 on the horizontal axes.

While it was observed that the masking sounds decreased SNR, an index of the intelligibility to a listener in the experimental settings, regulating the continuous volume of the masking sounds dynamically to an appropriate level could improve performance. The system may adjust the volume of the speakers under feedback control while targeting a quantity measured by distributed microphones. Assuming that SNR to the listener may be approximated by SNR calculated at a quiet Plug near the listener, together with sound levels at the conversers' wearable controllers, the control code for the masking sound can use this estimated SNR for adjusting the volume.

The induced masking sound level may also be measured at the position of the conversation with the wearable controller. Since background noise heard at the conversation can quantify how much the conversers are perturbed by the masking sounds, it could be used as another quantity for adjusting the volume. Furthermore, a multivariable problem is posed when considering several simultaneous conversations with multiple eavesdroppers. This problem can be formulated as adjusting the masking amplitude at each plug to optimally shield the conversationalists from the eavesdroppers while minimizing or bounding the masking-induced distraction to the conversing people and any noise-related disturbance to others.

To calculate SNR, only the received sound power was used, setting a threshold to separate speech and silence at the wearable controller. The process of segmenting speech and silence is often called voice activity detection. A recently developed wearable badge [Olguin, D. O., Paradiso, J., and Pentland, A. S., "Wearable Communicator Badge Designing a New Platform for Revealing Organizational Dynamics," *IEEE 10th Intl. Symposium on Wearable Computing (Student Colloquium Proceedings)*, Montreaux, Switzerland. Oct. 11-14, 2006, pp. 4-6] exploits an analog filter with several frequency bands selected for detecting speech. Such audio processing could be used to better estimate SNR Various voice recognition technologies known in the art may optionally be employed to quantify intelligibility to the eavesdropper. Similarly, the wearable controller could transmit very short grains of compressed conversational audio that could be correlated with audio received near potential listeners to more precisely quantify signal-to-noise. Such approaches may pose a privacy concern, because the Plug can be thought to be similar to a "bug," an eavesdropping device that intentionally invades privacy. Thus, it is necessary to be careful neither to store nor transmit signals of sufficient duration or quality to discern the content of the conversation. Fortunately, this application only requires whether, or how much, the conversation is being leaked, not the content of the conversation.

This system should preferably be socially acceptable. When activated, the system will preferably fade on gradually without a shocking, abrupt transient. Similarly, other sources of masking noise, such as background music, may optionally be adopted. The small speakers on the present plug hardware exhibit limited quality, but it will be clear to one of ordinary skill in the art that superior performance will be attained with speakers of higher fidelity.

The relative locations of the Plugs, conversers (wearable controller), and the eavesdroppers need to be roughly estimated for this system. Although the system was not evaluated with location-aware operation beyond motion sensors for eavesdropper detection, an established RSSI approach [Bahl, P., and Padmanabhan, V., "RADAR: An In-Building RF-based User Location and Tracking System," *Proc. IEEE INFOCOM*, Tel-Aviv, Israel, March 2000, Vol. 2, pp. 775-784], which uses several fixed beacons as location references, could be employed. A deficiency of this method, in addition to its inaccuracy, is that the reference nodes need to know their location. Considering that the present application requires only coarse, relative neighborhood positions, especially within the range of audible acoustic signals, a good alternative approach is acoustic-based localization, such as ToA (Time-of-Arrival) and AoA (Angle-of-Arrival). ToA localization with ultrasound has been investigated for many years [Priyantha N. B., Chakraborty, A., Balakrishnan, H., "The Cricket location-support system," *Proceedings of the 6th annual international conference on Mobile computing and networking*, pp. 32-43, Aug. 6-11, 2000, Boston, Mass., United States]. Scott et. al. showed a ToA localization approach to detect human sounds such as finger clicks for 3D user interfaces [Scott, J., and Dragovic, B., "Audio Location: Accurate Low-Cost Location Sensing," *Proc. of The Third International Conference on Pervasive Computing*, pp. 1-18, 2005]. Calibration of a microphone and speaker network with the ToA of audible sound was presented in Raykar, V. C., Kozintsev, I., and Lienhart, R., "Position calibration of audio sensors and actuators in a distributed computing platform," *Proceedings of the Eleventh ACA international Conference on Multimedia—MULTIMEDIA* '03, Berkeley, Calif., USA, Nov. 2-08, 2003, ACM Press, New York, N.Y., 2003, pp. 572-581, although the range is limited to 2-3 meters due to the attenuation of the audible sound. Girod et. al. showed an acoustic AoA estimation with a 4-channel microphone array, and their prototype obtained 1.5 degree average orientation error in their outdoor experiment with using a chirp sound [Girod, L., Lukac, M., Trifa, V., Estrin, D., "The design and implementation of a self-calibrating distributed acoustic sensing platform," *Sensys* 06, ACM, 2006, pp. 71-84]. Another alternative is to exploit environmental signals to estimate node location. Wren et. al. [Wren C. R., and Rao, S. G., "Self-configuring, lightweight sensor networks for ubiquitous computing," *The Fifth International Conference on Ubiquitous Computing: Adjunct Proceedings,* 2003, pp. 205-6; MERL Technical Report TR2003-24] showed that data from simple motion detectors can statistically derive the spatial arrangement of the sensors. In this application, natural sonic transients, such as door slams or footsteps, could also be exploited to determine relative node positions [Kim, D. S., "Sensor Network Localization Based on Natural Phenomena", M. Eng. Thesis, MIT EECS & Media Lab, 2006].

In the current prototype, the only network interface on the Plug is a generic radio, as often employed in wireless sensor networks [Hill. J., Szewczyk. R., Woo. A., Hollar, S., Culler, D., and Pister., K., "System architecture directions for network sensors," *Architectural Support for Programming Languages and Operating Systems,* 2000, pp. 93-104; Crossbow Technology]. This is suitable for communication with low-power wireless devices, such as the wearable controller in this application. In addition to the radio, employing higher-bandwidth power-line communication would be beneficial for transferring large quantities of data, such as digital content. For example, in this application, audio data does not need to be stored in an SD-card in advance if it is possible to transfer audio samples from a central server on demand. Both communication channels could be useful in the network architecture of the speaker and sensor network of the present invention.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A distributed acoustic conversation shielding system, comprising:
    a transducer network, comprising:
        a plurality of sensors, the sensors configured to detect the location of a conversation to be shielded and the presence and location of at least one potential eavesdropper; and
        a plurality of audio output devices, the audio output devices being capable of producing masking sounds to shield the conversation from the potential eavesdropper; and
    at least one controller for automatically controlling the operation of the transducer network in response to real-time data received from the sensors, wherein the controller is configured for automatically, dynamically, and continuously adjusting at least one of the masking sound type, location, and volume of at least one audio output device in response to changes in the dynamic location of the conversation relative to the location of the eavesdropper, said adjustment occurring in real-time as movement of at least one of the location of the conversation or the eavesdropper is occurring.

2. The conversation shielding system of claim 1, further comprising at least one portable controller apparatus having at least one sensor or control.

3. The conversation shielding system of claim 2, the portable controller further comprising a manual control for engaging the conversation shielding system when desired.

4. The conversation shielding system of claim 2, the portable controller further comprising a microphone for detecting when a conversation to be shielded is taking place so that the conversation shielding system may be automatically engaged.

5. The conversation shielding system of claim 1, further comprising an alert function that engages when the system cannot properly shield a conversation from one or more of the detected eavesdroppers.

6. The conversation shielding system of claim 1, wherein the sensors detect at least one of sound, motion, or vibration to detect the presence and location of eavesdroppers.

7. The conversation shielding system of claim 1, wherein the system automatically engages when a conversation to be shielded and an eavesdropper are detected.

8. The conversation shielding system of claim 1, wherein the system may be manually engaged.

9. The conversation shielding system of claim 1, wherein at least one of the audio output devices is co-located with at least one of the sensors.

10. The conversation shielding system of claim 1, wherein the system is scalable to shield multiple simultaneous conversations from multiple eavesdroppers.

11. The conversation shielding system of claim 1, further comprising at least one wireless link for communicating between the transducer network and the controller.

12. The conversation shielding system of claim 2, further comprising at least one wireless link for communicating between the transducer network and the portable controller.

13. The conversation shielding system of claim 1, further comprising a central server.

14. The conversation shielding system of claim 1, wherein the controller employs feedback control in determining how to adjust at least one of the masking sound type, location, and volume in order to minimize annoyance to the conversation to be shielded while minimizing intelligibility of the conversation to the eavesdropper.

15. A distributed acoustic conversation shielding system, comprising:
    a detector network, the detectors configured to detect at least the location of a conversation to be shielded and the presence and location of at least one potential eavesdropper; and
    a sound generation network, the sound generation network comprising a plurality of sound generation devices, the sound generation devices being capable of producing masking sounds to shield the conversation from the potential eavesdropper; and
    at least one controller for automatically controlling the operation of the sound generation network in order to shield the conversation and in response to real-time data received from the detectors, wherein the controller is configured for automatically, dynamically, and continuously adjusting at least one of the masking sound type, location, and volume of at least one sound generation device in response to changes in the dynamic location of the conversation relative to the location of the eavesdropper, said adjustment occurring in real-time as movement of at least one of the location of the conversation or the eavesdropper is occurring.

16. The conversation shielding system of claim 15, further comprising at least one portable controller apparatus having at least one sensor or control.

17. The conversation shielding system of claim 16, further comprising at least one manual control for engaging the conversation shielding system when desired.

18. A method for acoustically shielding conversation, comprising:
- identifying, using a detector network, the presence and location of a conversation to be shielded;
- detecting, using a detector network, the presence and location of a potential eavesdropper;
- automatically determining at least one of a masking sound type, location, and volume that will shield the conversation from the detected eavesdropper;
- directing emission of a masking sound from at least one audio output device in order to shield the conversation;
- automatically, dynamically, and continuously adjusting at least one of the masking sound type, location, and volume of at least one audio output device in response to detected real-time changes in the dynamic location of the conversation relative to the location of the eavesdropper, said adjustment occurring in real-time as movement of at least one of the location of the conversation or the eavesdropper is occurring; and
- continuing to shield the conversation until it ends or the eavesdropper is no longer detected.

19. The method of claim 18, further comprising the step of adjusting at least one of the masking sound type, location, and volume in response to movement of at least one of the location of the conversation to be shielded or the eavesdropper.

20. The method of claim 18, further comprising the step of receiving a manually initiated signal to begin engagement of the conversation shielding system.

* * * * *